United States Patent [19]

Rosenberg

[11] Patent Number: 5,020,121
[45] Date of Patent: May 28, 1991

[54] NEIGHBORHOOD BLOCK PREDICTION BIT COMPRESSION

[75] Inventor: Charles J. Rosenberg, Hewlett, N.Y.

[73] Assignee: Hewlett-Packard Company, Palo Alto, Calif.

[21] Appl. No.: 568,002

[22] Filed: Aug. 16, 1990

[51] Int. Cl.$^5$ .............................................. G06K 9/36
[52] U.S. Cl. .................................. 382/56; 358/261.3; 382/13; 382/27; 400/110
[58] Field of Search .................. 382/56, 54, 10, 13, 382/14, 25, 27, 9; 358/426, 261.2, 261.3, 432, 433, 133; 341/51; 364/523; 340/748; 400/111

[56] References Cited

U.S. PATENT DOCUMENTS

| | | | |
|---|---|---|---|
| 4,680,804 | 7/1987 | Kuzunuki et al. | 382/13 |
| 4,700,402 | 10/1987 | Okai et al. | 382/56 |
| 4,718,102 | 1/1988 | Crane et al. | 382/13 |
| 4,754,492 | 6/1988 | Malvar | 358/133 |
| 4,831,657 | 5/1989 | Casey et al. | 382/39 |
| 4,850,026 | 7/1989 | Jeng et al. | 382/21 |
| 4,903,312 | 2/1990 | Sato | 382/9 |
| 4,903,313 | 2/1990 | Tachikawa | 382/27 |
| 4,959,868 | 9/1990 | Tanioka | 382/56 |
| 4,965,754 | 10/1990 | Stansfield et al. | 382/56 |
| 4,972,497 | 11/1990 | Saito et al. | 358/261.3 |

OTHER PUBLICATIONS

C. A. Andrews et al., "Adaptive Data Compression", Proc. I.E.E.E., vol. 55(1967), pp. 267-277.
Wang et al., "Machine Recognition of Printed Chinese Characters Via Transformation Algorithms", Pattern Recognition, vol. 5 (1973), pp. 303-321.
Siromoney et al., "Computer Recognition of Printed Tamil Characters", Pattern Recognition, vol. 10 (1979), pp. 243-247.
M. Nagao, "Data Compression of Chinese Character Patterns", Proc. I.E.E.E., vol. 68 (1980), pp. 818-829.
Yamamoto et al., "Recognition of Handprinted Characters by an Outermost Point Method", Pattern Recognition, vol. 12 (1980), pp. 229-236.
Chinnuswamy et al., "Recognition of Handprinted Tamil Characters", Pattern Recognition, vol. 12 (1980), pp. 141-152.
Yhap et al., "An On-Line Chinese Character Recognition System", I.B.M. Jour. Res. Develop., vol. 25 (1981), pp. 187-195.
Spivey, "Data Compression Technique for APA Printer (Change Block Skipping)", I.B.M. Tech. Disclos. Bull., vol. 23 (1981), pp. 5464-5467.
Fitch and Spivey, "Font Data Reduction by Scan Compression for Ink Jet Printers", I.B.M. Tech. Disclos. Bull., vol. 23 (1981), pp. 5471-5472.

(List continued on next page.)

Primary Examiner—David K. Moore
Assistant Examiner—Joseph Mancuso

[57] ABSTRACT

A method for compression of data used to describe an ideographic character, or a set of such characters such as Japanese, Chinese, Hebrew, Arabic or Tamil characters or a set of two-level images, on a computer screen. The computer screen is divided into an array of non-overlapping pixel sub-blocks, each J pixels wide by K pixels high, and a neighborhood of L adjacent pixels is defined for each target sub-block. The known pixel configuration (white versus black or off versus on) of the neighborhood of pixels is used to predict the rth most probable pixel configuration for each target sub-block, for $r = 1, 2, \ldots, R-1$ ($R \geq 2$), based on a statistical analysis of the sub-block pixel configurations for all characters in the set. Where a particular target sub-block pixel configuration cannot be predicted from the $R-1$ pixel configurations associated with the neighborhood pixel configuration, the exact pixel configuration is used. Use of the exact sub-block pixel configuration is not often required. This method allows an average percentage compression or bit savings for the bit map representation that ranges from about 30 percent to about 70 percent, for a well known set of 6802 Kanji characters.

22 Claims, 5 Drawing Sheets

OTHER PUBLICATIONS

Parhami et al., "Automatic Recognition of Printed Farsi Texts", Pattern Recognition, vol. 14 (1982), pp. 395–402.

M. Kushnir et al., "An Application of the Hough Transform to the Recognition of Printed Hebrew Characters", Pattern Recognition, vol. 16 (1983), pp. 183–191.

Sugita et al., "Multi-font Kanji Generator", Trans. I.E.C.E., vol. E66 (1983), pp. 377–382.

Ni et al., "Single Pass Method for Labelling Black/White Image Objects", I.B.M. Tech. Disclos. Bull., vol. 26 (1984), pp. 5481–5482.

M. Kushnir et al., "Recognition of Handprinted Hebrew Characters Using Features Selected in the Hough Transform Space", Pattern Recognition, vol. 18 (1985), pp. 103–114.

Anonymous, "Compression/Decompression of Font Patterns", I.B.M. Tech. Disclos. Bull., vol. 28 (1986), pp. 3563–3564.

El-Sheikh et al., "Computer Recognition of Arabic Cursive Scripts", Pattern Recognition, vol. 21 (1988), pp. 293–302.

Maeder, "Local Block Pattern Methods for Binary Image Encoding", Proc. 1988 Ausgraph Conference.

F. H. Cheng et al., "Recognition of Handwritten Chinese Characters by Modified Hough Transform Techniques", I.E.E.E. Trans. on Pattern Analysis and Machine Intelligence, vol. 11 (1989), pp. 429–439.

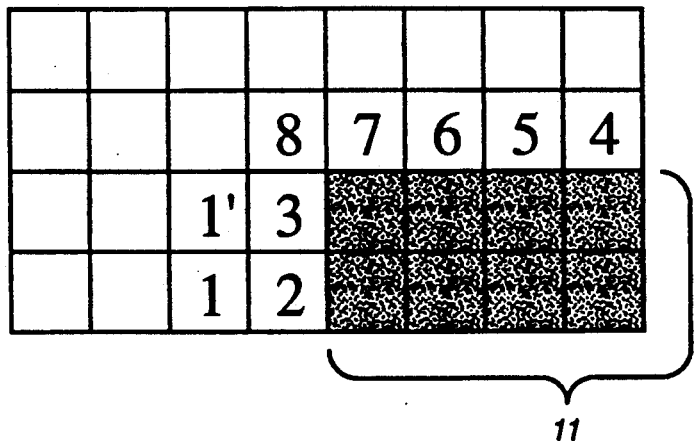
FIG._1
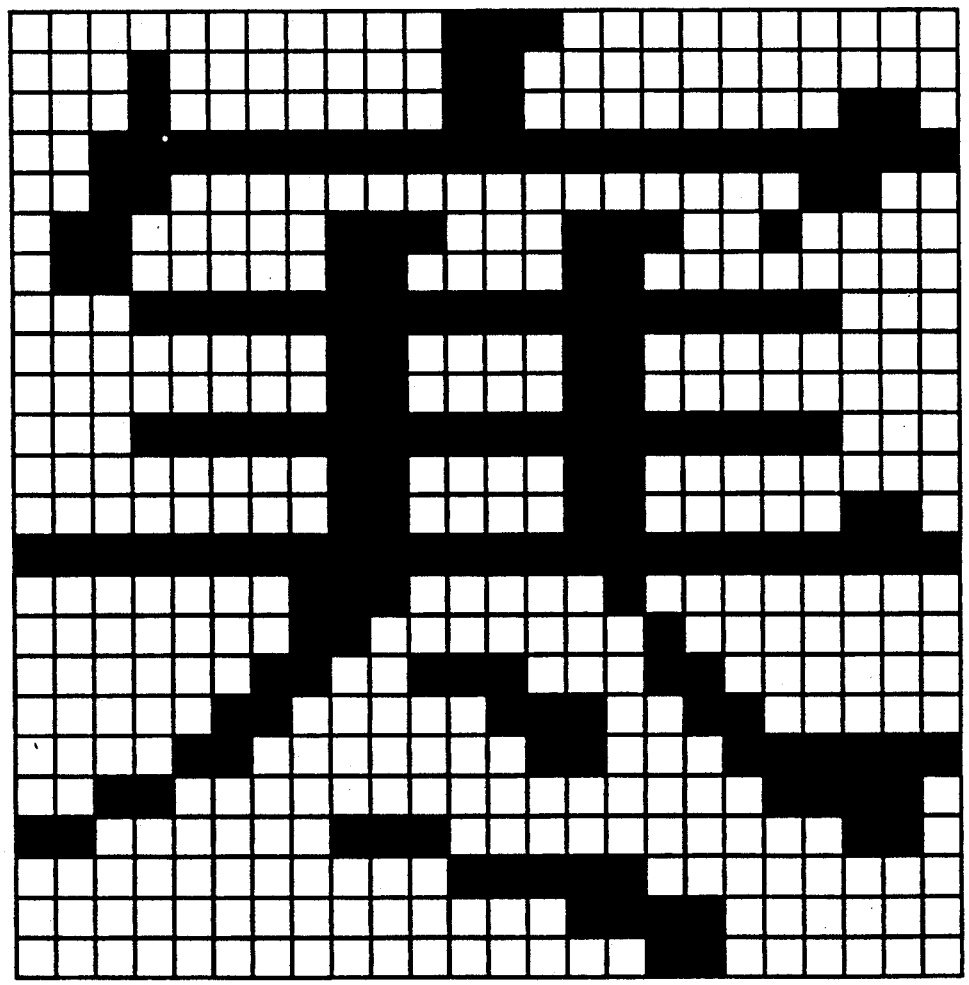
FIG._2

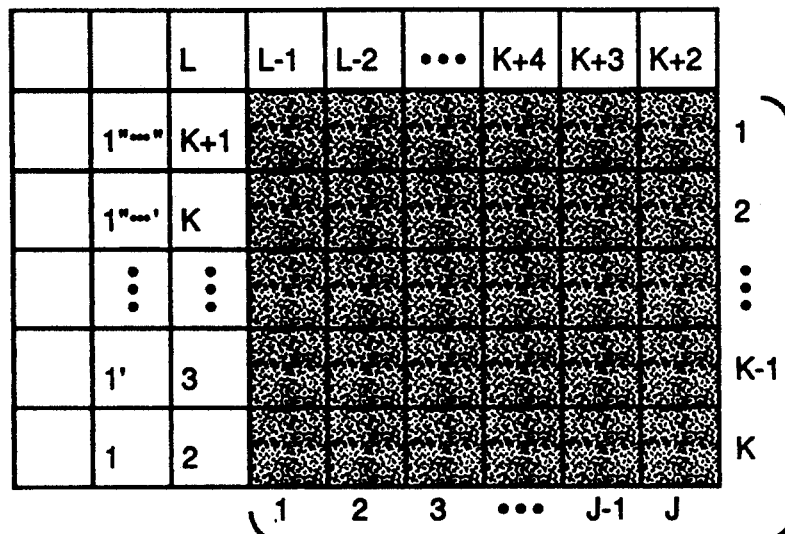
FIG._1A
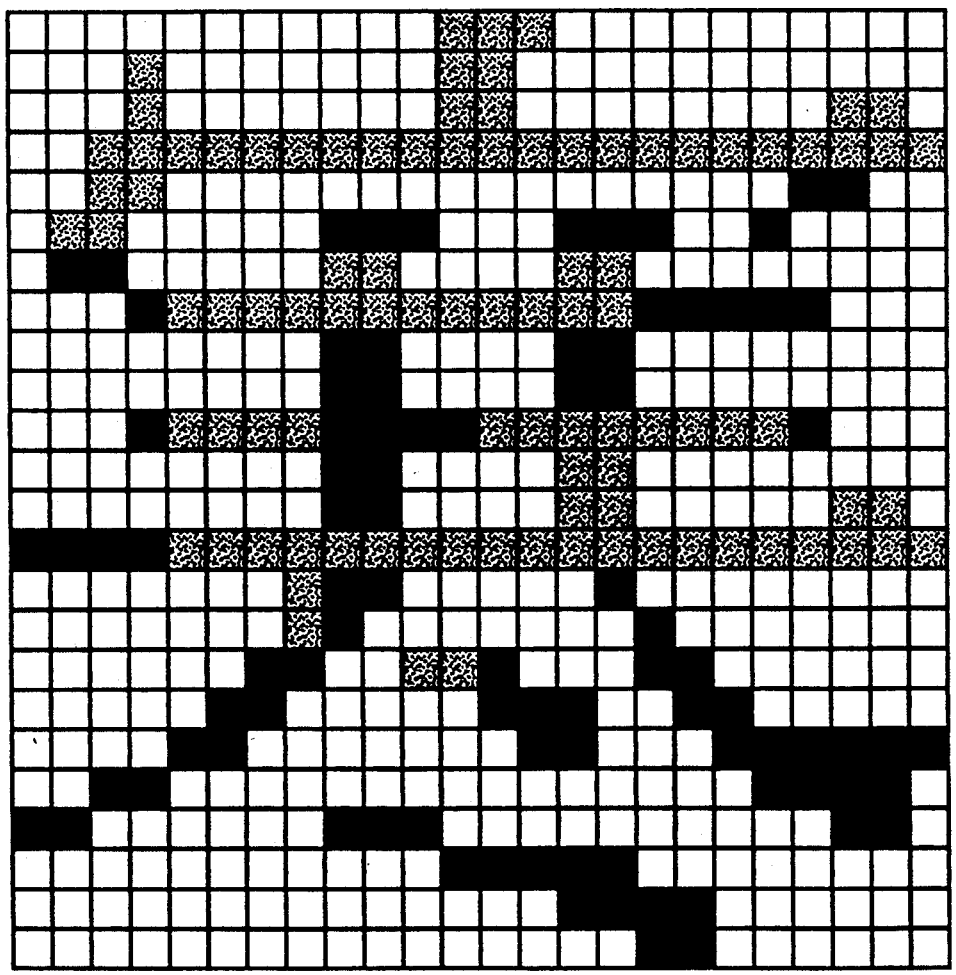
FIG._4

3: 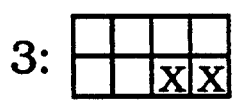
FIG._3A
6: 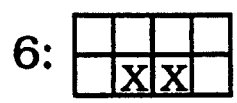
FIG._3B
7: 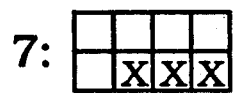
FIG._3C
11: 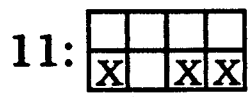
FIG._3D
13: 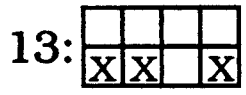
FIG._3E
14: 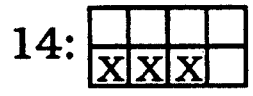
FIG._3F
31: 
FIG._3G
46: 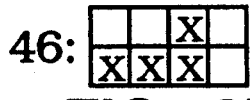
FIG._3H
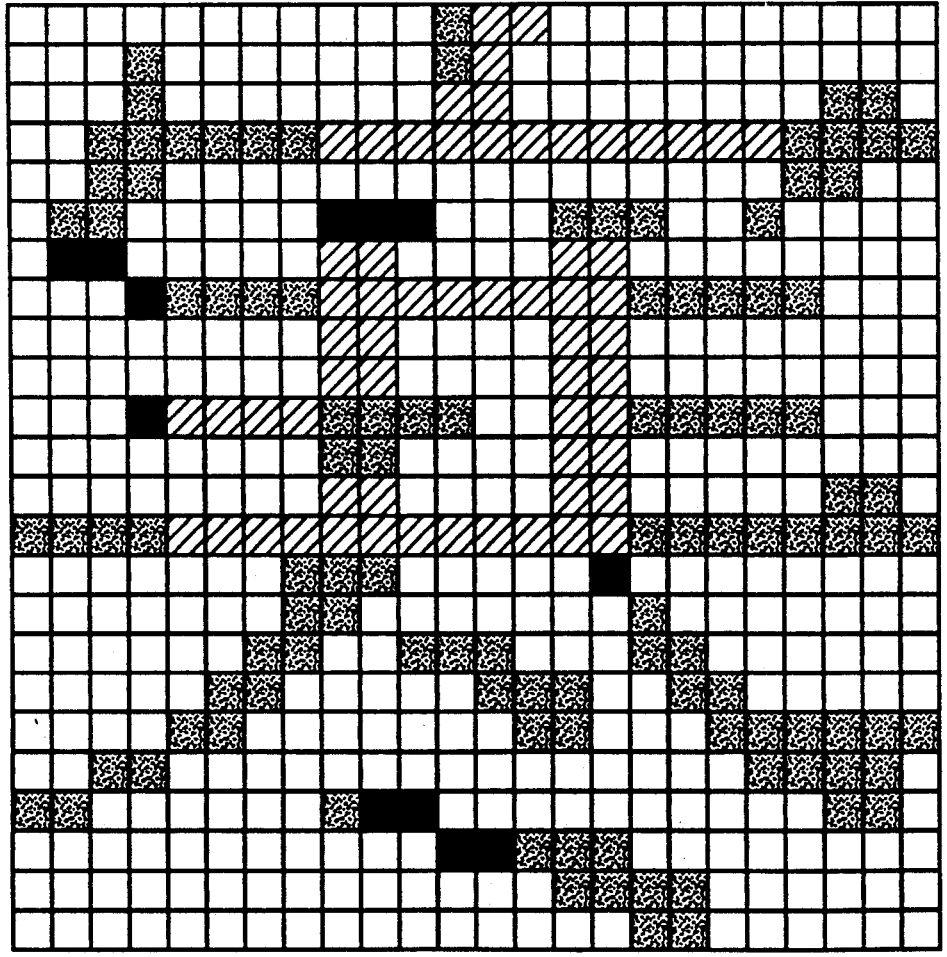
FIG._5

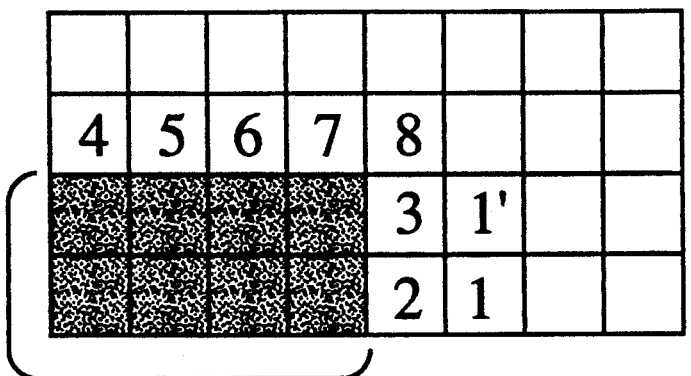
FIG._6
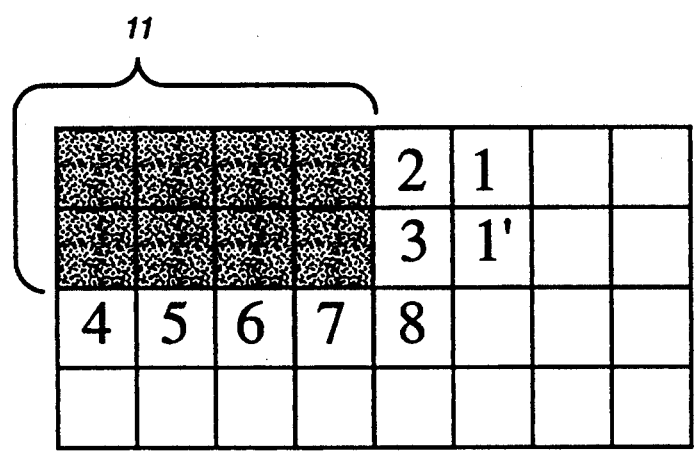
FIG._7
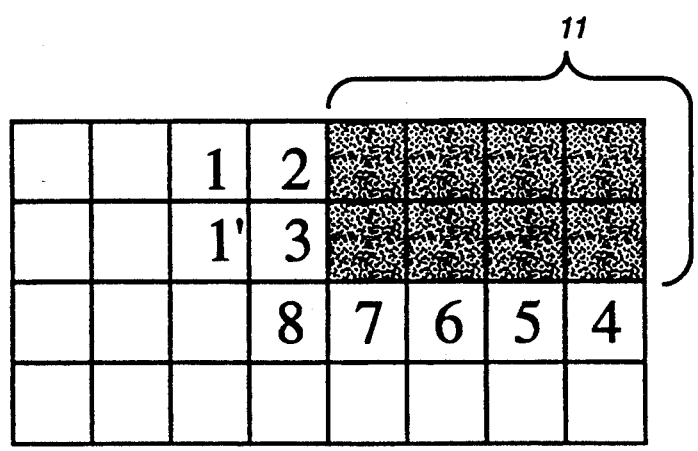
FIG._8

NEIGHBORHOOD BLOCK PREDICTION BIT COMPRESSION

TECHNICAL FIELD

This invention relates to algorithms for compressing the bit map description of a data field for efficient storage in a memory, and more particularly to application of these algorithms to efficient description of character symbols used in pictographic languages such as Japanese, Chinese, Hebrew, Arabic, Tamil and Farsi.

BACKGROUND ART

Data compression techniques, applicable to text, graphics and other representatives of information, have been used in many areas of communications such as voice, video, telemetry transmission and storage and retrieval of voluminous data. Of the techniques developed, adaptive data compression is one of the most attractive, because of its ability to increase the bandwidth utilization efficiency for data by reducing the data redundancy. C.A. Andrews et al., in "Adaptive Data Compression", Proc. I.E.E.E., Vol. 55 (1967) pp. 267–277, have noted that data compression techniques can be divided into four categories. "(1) Direct data compression techniques, which include variable rate compressors such as interpolators, polynomial predictors and bit-plan encoding, and fixed rate compressors such as optimum prediction, differential coding, probabilistic coding and adaptive sampling; (2) Linear and nonlinear transformation compression techniques that use pre-process filters, logarithmic amplifiers, filters, limiters/clippers, companders, Fourier filters and Karhunen-Loeve optimum discrete compression filters; (3) Parameter extraction compression techniques, in which one or more parameters associated with or derivable from the signal are use to represent the signal; and (4) Selective monitoring compression techniques that monitor the data and select a portion thereof for transmission or storage.

The efficient representation and storage of collections of ideographic characters or symbols from languages such as Chinese, Japanese and Hebrew is of particular interest here because of the large number of characters required in any reasonable language set. For example, a system of Chinese character patterns should contain 2500–4000 characters in order to adequately represent at least 99.5% of the characters that appear in ordinary text in that language. Chinese characters are also used in Japan, but the total number of characters is indefinite. For example, the Japanese Ministry of Education has identified 881 characters to be learned in elementary and middle schools and an additional 969 characters that should be known for ordinary daily use. Daily newspapers in Japan use about 4000 characters, and one standard code system for such characters contains 6349 characters. In another standard Japanese character set, 6802 characters appear. The most elaborate dictionary for Chinese characters in Japan contains approximately 50,000 characters. According to statistics accumulated on character use, a selected set of about 3000 characters covers about 99.9% of all the characters that appear in newspapers and journals in Japan. Even if one retreats to this smaller number, the task of representing such a large set, each described by a rectangular pattern of M dots by N dots, the task is daunting. If, instead, one concentrates on a larger and more adequate set of 6349 characters or 6802 characters that includes many specialized professional and scholarly characters, the task becomes more daunting.

Crane et al., in U.S. Pat. No. 4,718,102, disclose separation of recognition of complex characters, such as Kanji, into an algorithmic technique, which serves to identify a first set of all possible characters that are consistent with a given observed pattern of pixels, and a disambiguation technique, which serves to remove the ambiguity or possible confusion among all the characters of the first set by use of additional features or parameters associated with the target character. The inventors observe that, statistically, a Kanji character having more than 20 strokes or fewer than 5 will be much easier to distinguish, as compared with a Kanji character having approximately 10 strokes. Stroke characteristics are relied upon for the algorithmic portion of pattern recognition here, with statistics on different categories of statistics being accumulated and analyzed.

Use of pixel neighborhoods surrounding or adjacent to a pixel for optical character recognition purposes is disclosed by Casey et al. in U.S. Pat. No. 4,831,657. A probability table is constructed for recognition of characters expressed in a new font, based on the probabilities associated with characters expressed in a known font. A decision tree is generated and used to analyze the new font. This approach requires the use of a reference font, or something similar, for recognition of characters expressed in a new font.

In U.S. Pat. No. 4,850,026, Jeng et al. disclose extraction of all useful features of a set of characters expressed in a given font, as a character feature database. The particular database features discussed here are vertical, horizontal and diagonal character strokes within each of a sequence of rectangular groups of pixels that cumulatively cover all pixels on the screen.

Several techniques have been proposed for data compression of Chinese or Japanese character patterns. M. Nagao, in "Data Compression of Chinese Character Patterns", Proc. I.E.E.E., Vol. 68 (1980) pp. 818–829, reviews several techniques that have been proposed for such compression, using statistics of the patterns and other approaches. Two-dimensional predictive coding has been proposed in which a character pattern is divided into a sequence of rectangular pixels and the black versus white value of a particular pixel is predicted by use of the pattern of four nearest neighbor pixels. Pattern coding by m-by-n sub-blocks has also been used, relying on the fact that Chinese characters are primarily straight lines. Other techniques include stroke representation, where the strokes are straight line segments represented by vertical, horizontal and ±45° strokes on a mesh grid. Contour coding has been used to account for the fact that some portions of Chinese characters are curvilinear rather than being straight line segments. Weighted sums of four adjacent surrounding points has been used for pixel prediction as well.

In "Machine Recognition of Printed Chinese Characters Via Transformation Algorithms", Pattern Recognition, vol. 5 (1973), pp. 303–321, Wang and Shiau identify 63 characteristic sub-patterns on the left side of Chinese characters and an unspecified number of sub-patterns on the right side thereof, which together make up whole characters. Their general pattern recognition system includes: (1) receptor module that represents each Chinese character received as a rectangular matrix of pixels; (2) a pre-processor module that uses a Fourier, Hadamard, Rapid or other two-dimensional transform technique to transform the character to a form that is more easily recognized and processed; (3) a classifier module that examines each pixel pattern and assigns it to one of a number of categories based on a decision rule such as minimum-distance-to-mean of a reference character or feature; and (4) a memory module to store each of the classified characters for later retrieval. The classification step appears to introduce some loss of information here, and a character is force-fitted into one of the reference character categories so that the character may be incorrectly recognized and categorized.

Yamamoto and Mori, in "Recognition of Handprinted Characters By An Outermost Point Method," Pattern Recognition, vol 12 (1980), pp. 229-236, used a 64×64 pixel pattern, with each pixel having any of 16 levels of darkness, and construct the convex hull of each character examined. A hole, which arises from a plurality of dark pixels that completely surround one or more light pixels, is treated separately. The convex hull of each character is expressed as a mask, and the collection of masks forms a dictionary for character recognition.

F-H. Cheng, et al. in "Recognition of Hand Written Chinese Characters by Modified Hough Transform Techniques", I.E.E.E. Trans. on Pattern Analysis and Machine Intelligence, Vol. 11 (1989) pp. 429-439, uses a modified Hough transform technique plus dynamic programming to characterize and recognize hand written Chinese characters. In the Hough transform technique, a new twodimensional coordinate space is generated in which all points that lie on a straight line segment will map into a single point in the Hough transform space. The Hough transform technique has also been applied to printed and hand written Hebrew characters by M. Kushnir et al., in "An Application of the Hough Transform to the Recognition of Printed Hebrew Characters", Pattern Recoonition, Vol. 16 (1983) pp. 183-191, and in "Recognition of Hand Printed Hebrew Characters Using Features Selected in the Hough Transform Space", Pattern Recognition, Vol. 18 (1985) pp. 103-114.

Siromoney et al., in "Computer Recognition of Printed Tamil Characters," Pattern Recognition, vol. 10 (1979), pp. 243-247, use a run length encoding approach, applied to each line of a digitized character, to recognize and distinguish between Tamil characters.

Chinnuswamy et al., in "Recognition of Handprinted Tamil Characters," Pattern Recognition, vol. 12 (1980), pp. 141-152, apply stroke characterization techniques to linear and curvilinear segments that make up a Tamil character and use computed correlation coefficients for character recognition.

In "Automatic Recognition of Farsi Texts," Pattern Recognition, vol. 14 (1982), pp. 395-403, Parhami et al. discuss five difficulties in recognition of Farsi text and disclose a method that combines digitization, line separation, sub-word and character separation and geometrical characterization for Farsi character and text recognition.

In "Computer Recognition of Arabic Cursive Scripts," Pattern Recognition, vol. 21 (1988), pp. 293-302, El-Sheikh et al. use segmentation of words to obtain individual characters and use truncated Fourier analysis to obtain descriptors of each Arabic character.

Yhap et al. disclose the use of 72 constituent shapes or stroke combinations for Chinese character recognition in "An On-line Chinese Character Recognition System," IBM Jour. Res. Develop. vol. 25 (1981), pp. 187-195. About 2200 characters can be recognized by this method, but not all characters are described solely in terms of these constituent shapes.

Spivey, in "Data Compression Technique for APA Printer (Change Block Skipping), IBM Tech. Disclos. Bull. vol. 23 (1981), pp. 5464-5467, compare each scan line of pixels representing an image with the preceding scan line, noting only the changes, if any, in each corresponding group of four or eight consecutive pixels. The net compression achievable in the example given by Spivey would probably disappear when applied to a complex shape such as a Kanji character. The following article by Spivey, ibid., pp. 5468-5470, also discusses application of Change Block Skipping.

K. Toraichi et al., in "Handprinted Chinese Character Database", published in Computer Recognition and Human Production of Handwriting, ed. by R. Plamondon et al., World Scientific Publishing Co., 1988, pp. 131-148, have analyzed 48,000 characters, divided into 12 sets of 4,000 categories each, of handprinted Chinese characters and have determined statistical profiles of each category (numbers of connected components, "holes", contours, etc.). They have also determined the "horizontal complexity" and "vertical complexity", and "contour gradients", as defined therein, of each category. Much data are presented, but the significance of several of the statistical parameters is not made clear.

Scan-oriented methods of character recognition and encoding scan the original character, for example, line by line in a horizontal or vertical direction, in a predetermined path that is independent of the character. These approaches are the easiest and least expensive to implement but often produce only modest data compression. Fitch and Spivey, in "Font Data Reduction by Scan Compression for Ink Jet Printers", IBM Technical Disclosure Bulletin, vol. 23 (1981), pp. 5471-5472, disclose use of a run length encoding scheme, change block skipping, in which only the positions of changes in pixel values (dark-to-light or light-to-dark) are encoded. In "Compression/Decompression of Font Patterns", IBM Technical Disclosure Bulletin, vol. 28 (1986), pp. 3563-3564 (anonymous), consecutive scan lines of all-light pixels are represented by a single number, and only scan lines with one or more dark pixels therein are represented by full-detail bit patterns. Each of these approaches achieves a modest reduction in the amount of bit map information required to represent a character. However, as noted above, pure scan-oriented methods may produce no reduction when applied to complex characters such as those drawn from a Kanji or Hebrew character set.

Horizontal, vertical and slanted strokes (line segments) are used by Sugita et al. for Kanji character recognition and encoding in "Multi-font Kanji Generator", Trans. I.E.C.E., vol. E66 (1983), pp. 377-382. The two pixel end points of the line segment are specified, and intermediate (dark) pixels are determined by interpolation. This is a variation on a one-dimensional scanoriented approach in which scan lines in any and all directions are used. Changes of the fonts used, for example, from the well known Mincho font to another style is implemented by changing the interpolation rules.

Maeder, in "Local Block Pattern Methods for Binary Image Encoding", Proceedings of the 1988 Ausgraph Conference, discloses use of a neighborhood expansion approach in which each of a collection of dark and light pixel neighborhoods is expanded one row or line at a time, using a collection of like-row or like-column expansion rules that are only partly enumerated in the paper. Applied to a complex Kanji character, this approach would likely produce a large number of small neighborhoods with little or no similarity to one another. However, this approach does attempt to exploit two-dimensional similarity in character recognition and encoding.

Many of these techniques produce some characters that are either incomplete, contain extra line segments, are not esthetically pleasing, or offer relatively little reduction in the information required to be stored in memory to represent each character in the character set. What is needed is an approach that will provide a 30-70 percent reduction in the amount of information required to exactly represent each character in a character set and will provide the same amount of resolution, upon decompression, as is used to represent each of the characters in the original images.

SUMMARY OF THE INVENTION

These needs are met by a method of data compression that describes a character or symbol represented on a block of pixels in which the block is decomposed into a plurality of mutually exclusive, rectangular subblocks each of a selected size J pixels by K pixels, with the sub-blocks being numbered consecutively $s = 1, 2, \ldots, S$ beginning at one corner of the block and proceeding consecutively row-by-row or column-by-column. Each sub-block is also represented by unique two-dimensional, row-and-column coordinates $(J,K)$ $(j = 1, 2, \ldots, J; k = 1, 2, \ldots, K)$, where the row (coordinate m) containing the selected corner has sub-blocks with coordinates $(1,1), (2,1), \ldots, (J,1)$ and the column (coordinate n) containing the selected corner has sub-blocks with coordinates $(1,1), (1,2), \ldots, (1,K)$. The exact pixel configuration is initially determined for each of the sub-blocks numbered $(m,n) = (1,1), (2,1), \ldots, (J,1), (1,2), (1,3), \ldots, (1,K)$, and this information is used to predict the pixel configuration for each of the other sub-blocks that make up the block representing a given character.

For each pixel sub-block numbered $(j,k)$ with $j \geq 2$, $k \geq 1$ or $j \geq 1$, $k \geq 2$, the pixel values of certain "Contiguous Pixels" in the sub-blocks numbered $(j-1, k-1)$, $(j, k-1)$ and $(j-1, k)$, are determined, using the "Statistical Profile" of each separate pattern of contiguous pixels for all sub-blocks in the block of pixels. The sub-blocks are also consecutively numbered $s = 1, 2, \ldots, S$. Using a Statistical Profile of Contiguous Pixels, the rth most probable patterns of pixels in that sub-block are determined for $r = 1, 2, \ldots, R-1$, where R is a selected integer greater than or equal to 2. An index $a_{rs}$, corresponding to the choice of the rth most probable pattern for the sub-block numbered s, is assigned to that sub-block. For each sub-block numbered $s = 1, 2, \ldots, S$, the index $a_{rs}$ corresponding to the correct pattern for sub-block s is associated with that subblock, if one of the $R-1$ pixel patterns corresponding to the indices $a_{rs}$ ($r = 1, 2, \ldots, R-1$), is the correct pixel pattern. Otherwise, a flag or index $a_{Rs}$, which corresponds or "points" to the exact pattern for subblock s, is assigned to that sub-block and the exact pattern is provided. Finally, each sub-block numbered $s = 1, 2, \ldots, S$ is associated with the assigned index $a_{rs}$ ($r = 1, 2, \ldots, R-1$ or R) as an ordered pair of numbers (s, $a_{rs}$) The collection of these pairs of numbers provides a method of compression of data in a manner such that the compression exactly reproduces the character, with the same resolution as available in the original representation. The decompression process consists of assigning the pixel pattern corresponding to the index $a_{rs}$ to the sub-block number s for each sub-block in the block of pixels and assembling the sub-blocks of pixel patterns in the appropriate order.

The percentage compression or reduction of information (number of bits) required to describe the original data field is 30–70 percent. That is, the information required to represent a Chinese character pattern, on average, is 30–70 percent of the bit map information required to represent that character in a straightforward bit map approach.

BRIEF DESCRIPTION OF THE DRAWINGS

FIG. 1 illustrates the neighborhood prediction calculation, applied to a rectangular sub-block that is 4 bits × 2 bits in size.

FIG. 2 illustrates a typical Kanji character used in the Japanese language.

FIG. 3 illustrates a group of pixel patterns present in an example discussed in the specification.

FIG. 4 illustrates a first embodiment of the invention (one-level) applied to the character shown in FIG. 2.

FIG. 5 illustrates a second embodiment of the method (two-level) applied to the character shown in FIG. 2.

FIGS. 6, 7 and 8 illustrate other neighborhood predictor configurations that may be used with a 4 bit × 2 bit sub-block according to the invention.

FIG. 9 illustrates a more general pixel neighborhood that can be used in accord with the invention.

FIG. 10 illustrates a general choice of initial row and column of sub-blocks that can be used in accord with the invention.

BEST MODE FOR CARRYING OUT THE INVENTION

With reference to FIG. 1, one suitable neighborhood predictor configuration is illustrated in which the pixel pattern or configuration in a 4 bit × 2 bit sub-block, designated 11 for convenient reference, is to be predicted, using the pixel pattern shown in eight pixels, numbered $1, 2, \ldots, 8$ that lie near the upper left corner of the sub-block 11 and outside this subblock. Alternatively, the pixel numbered 1 may be replaced by the pixel numbered 1' in FIG. 1. The pixels numbered $1, 2, 3, \ldots, 8$ (or $1', 2, 3, \ldots, 8$) in FIG. 1 will be referred to herein as "Contiguous Pixels" and are used to predict the correct pixel pattern or configuration of the sub-block 11. The Contiguous Pixels form a pixel neighborhood of the sub-block 11 of interest, with an associated neighborhood value given by $$NV = \sum_{h=1}^{8} C_h \cdot 2^{h-1},$$

where each numerical coefficient $C_h$ is equal to 1 if the Contiguous Pixel numbered h is dark or "on" and is equal to 0 if that Contiguous Pixel is light or "off". The neighborhood value number NV has $2^8 = 256$ numerical values, namely the number $0, 1, 2, 3, \ldots, 255$, and each such sum NV uniquely specifies the pixel pattern of light and dark pixels for the Contiguous Pixel configuration used. If the Contiguous Pixel denoted 1 in FIG. 1 is replaced by the Contiguous Pixel denoted 1', the neighborhood value NV is defined analogously.

This assumes that a character or other ideographic symbol, such as the Japanese Kanji character shown in FIG. 2, is decomposed into a rectangular array of pixels as shown, and that the array of pixels is further divided into rectangular sub-blocks of size 4 pixels width by 2 pixels height as shown. Each pixel in the pixel representation of a character has one of two values, 0 or 1, corresponding to that pixel having a dark shading or a light shading, respectively, in a manner well known to workers in this field.

The 4 pixel by 2 pixel rectangular sub-block 11 shown in FIG. 1 may be replaced more generally by a J pixel by K pixel rectangular sub-block 11A as shown in FIG. 1A, with the Contiguous Pixels being an array of L pixels that lie adjacent to the upper edge or the left-hand edge of this sub-block, as illustrated in FIG. 1A. The number L need bear no relationship to the size (J×K) of the sub-block 11A, but for the particular configuration shown in FIG. 1A it is easily verified that L =J+K+2. In this instance, the neighborhood value of the pixel neighborhood of the sub-block 11A is defined by $$NV = \sum_{h=1}^{L} C_h \cdot 2^{h-1}.$$

A typical Japanese character set, including all of the Japanese Industrial Standard characters (JIS code) has 6802 characters. If each character is represented by a rectangular array of 24 bits×24 bits, this corresponds to 72 bytes per character or approximately 500 Kbytes of font data for the entire character set. If each character is represented by a rectangular array 40 bits×40 bits, a character requires 200 bytes, and the entire character set requires approximately 1.4 Mbytes of font data for its representation. Any font compression algorithm should losslessly encode and decode the characters. This is difficult with Kanji characters because of their complexity. Redundancy removal techniques try to identify horizontal or vertical lines of character data that are identical to other lines in the character and code and decode that relationship. Unfortunately, Kanji characters typically do not exhibit such regularity. However, certain regularities may be seen in Kanji character sets, when viewed by sub-block pixel patterns, and the invention uses this to advantage.

The invention uses a neighborhood predictor coder ("NPC"), related to the neighborhood value NV computed above, that identifies and takes advantage of certain horizontal and vertical regularities within a character by representing the character as an assembly of sub-blocks of the same size. The character is stored as a sequence of pixel scan lines of these sub-blocks. The ability to predict the "next" or target sub-block, given information about pixel patterns in three particular preceding sub-blocks, allows the information required to represent a given character to be compressed considerably (30–70 percent) on average. Each sub-block value in the character representation has an associated index that serves as a pointer to a lookup table of predicted pixel patterns, using the pixel patterns of the preceding sub-blocks as an index. A special pointer value or indicator or flag is used where the pixel patterns of the preceding sub-blocks do not produce a prediction of the exact pixel pattern desired for the target sub-block. In this case, which does not occur often, the actual sub-block pixel pattern is stored and a special index is associated with it. The index associated with a target sub-block may, in the embodiment shown in FIG. 1, have a single bit (having two values, 0 and 1) associated with each sub-block or may have a p-bit index with $2^P$ possible different values thereof. In each case, one index value is chosen that corresponds to a flag indicating the actual sub-block pixel pattern that is to be substituted, and the remaining index values (1 for a single bit index, and $2^P-1$ for the p-bit index) may be chosen to correspond to other probable pixel patterns (possibly, including the actual pixel pattern) that are predictable from the Contiguous Pixel pattern.

In a first implementation of the method, the sub-block size is chosen to be four pixels wide by two pixels high (J=4, K=2) as shown in FIG. 1, so that each sub-block contains exactly one byte, if one bit is associated with each of the eight pixels therein. A p-bit flag or index is associated with each sub-block, with p=2 being chosen for illustration here. Eight bits or one byte is chosen for the collection of Contiguous Pixels used to predict the pixel pattern of a target subblock in order to speed decoding and make efficient use of predictive information. The number of pixels that make up the Contiguous Pixel configuration may be greater than or smaller than eight, using analogous approaches. The use of a two-bit index provides three possible pixel pattern predictions for each sub-block, plus a flag pointing to or indicating the location of the exact pixel pattern if none of these three predictions is correct. A predicted pixel pattern within the target sub-block is made by combining the eight nearby Contiguous Pixels shown in FIG. 1 that lie above and to the left of the target sub-block and using these eight pixel values as an eight-bit value, called the neighborhood value. A two-bit index is associated with this neighborhood, and the rth most probable pixel patterns numbered r=1, 2, . . ., $2^P-1=3$ are chosen from a Statistical Profile (described below) of possible sub-block pixel patterns that is generated for the collection of characters in the character set. Because each sub-block has eight pixels therein, $2^8=256$ possible pixel patterns are available for each rth most probable pixel pattern (r=1,2,3), and three tables with 256 one-byte entries each are required here. More generally, $2^P-1$ tables of 256 entries each would be required here. With reference to any pixel subblock, the group of pixels that make up the neighborhood predictor code ("NPC") used to predict the pixel pattern in that sub-block are referred to as the group of Contiguous Pixels for that sub-block, as discussed above.

A Contiguous Pixel for a given sub-block that ends up off or beyond the edge of the pixel array used to represent that character, is assigned a pixel value of zero. Thus, a sub-block that is positioned on the top row or on the left-most column of sub-blocks will have some or all of its Contiguous Pixels blank or "light". The set of Contiguous Pixels thus determined for this sub-block is then used to predict the pixel pattern of the sub-block, using the Statistical Profile information discussed below, in the same manner as any other subblock would be treated. Alternatively, a sub-block that is positioned on the top row or on the left-most column of sub-blocks may be given an indicator or flag that points to the location of the exact pixel pattern for that sub-block. Using either of these approaches, each sub-block positioned on the top row and/or on the left-most column of the pixel block (array of sub-blocks) has its exact pixel pattern determined; and determination of the pixel patterns of all other sub-blocks in the array proceeds in a straightforward manner, using the NPC. These two approaches are referred to herein as "determination of the exact pixel pattern" of the sub-block of interest.

A 4×2 sub-block is converted into a word W, with a bit value assignment expressed as follows:

|   | 8 | 7 | 6 | 5 | 4 |
|---|---|---|---|---|---|
|   | 3 | B8 | B7 | B6 | B5 |
| 1 | 2 | B4 | B3 | B2 | B1 |
|   | W = (B8, B7, B6, B5, B4, B3, B2, B1). | | | | |

More generally, a word W of a J×K sub-block will have J.K ordered entries, by analogy.

With each character in a character set, the following components are associated: (1) the $2^p-1$ predicted pixel patterns (and $2^p-1$ associated index values) associated with each of the 256 Contiguous Pixel patterns (always the same size); and (2) an index value and associated exact or actual pixel pattern for each sub-block whose pixel pattern cannot be predicted from (is not among) the $2^p-1$ pixel patterns available from the Statistical Profile (total number of these indices may vary with the size and nature of the character).

The Statistical Profile is generated by examining the pixel pattern of each target sub-block and associating with it either the pixel pattern of the Contiguous Pixels or, equivalently, the neighborhood value NV of the Contiguous Pixels for this target sub-block. A collection of these pairs, namely a target sub-block pixel pattern and an associated neighborhood value NV, is generated for all sub-blocks of each character in the set. For each of the 256 different pixel patterns of a pixel neighborhood of eight Contiguous Pixels, the collection of all sub-block pixel patterns associated with the neighborhood pixel pattern is analyzed, and the number of identical sub-block pixel patterns is counted for each of the possible 256 pixel neighborhood values NV. This produces a histogram, and the rth most probable subblock pixel patterns may be identified for $r=1, 2, \ldots, 2^p-1$ for each fixed neighborhood pixel pattern of Contiguous Pixels. These most probable sub-block pixel patterns provide a Statistical Profile for each such fixed neighborhood pixel pattern.

Compressing the information required to exactly represent each character in a character set requires two passes through the set of characters. First, a Statistical Profile is developed, as discussed above, by scanning through all characters in the set before any compression takes place, in order to determine the rth most probable sub-block pixel patterns $(r=1, 2, \ldots, 2^p-1)$ for each pixel neighborhood pattern of Contiguous Pixels present for the collection of characters and a given choice of sub-block size (4×2 or, more generally, J×K). A second pass through each character in the character set is made to determine an ordered set of $2^p-1$ or $2^p$ sub-block pixel patterns for the set of Contiguous Pixels associated with each sub-block for each character. If the configuration shown in FIG. 1 is used, eight Contiguous Pixels are used for each sub-block, with the possible exception of the sub-blocks lying in the uppermost row of sub-blocks and leftmost column of sub-blocks that include the upper left corner of the rectangular array of pixels used to represent each character in the character sets. The pixel patterns for sub-blocks lying in the uppermost row or in the leftmost column may be prescribed exactly (no predictions) in order to initiate the process, because these particular sub-blocks have one or more Contiguous Pixels absent.

The algorithm used for pixel pattern prediction here may also be implemented by generating a more general Statistical Profile using a plurality of sets of characters. These sets may be mutually exclusive or may have some overlap in the character contained in each such set. Using this generalized Statistical Profile, any other character could be encoded by a single pass that produces the Contiguous Pixel pattern or equivalent neighborhood value NV for each target sub-block in the pixel representation of this character. However, because the generalized Statistical Profile may not include the effects of this (new) character, the performance of this algorithm may be degraded somewhat, and a higher percentage of "flagged" exact patterns may be required to represent that character.

Although the size of the data required to represent each character is variable, because of the required use occasionally of an exact pixel pattern, the total overhead introduced here is $2^p-1$ tables, each having $2^{JK}$ entries for the general situation in FIG. 1A. For the particular choices p=2, J=4 and K=2 illustrated in FIG. 1, this overhead is not significant because it is shared among all 6802 characters. The overhead of $(2^p-1)$ 2JK is also not significant in the general case for reasonable choices of p, J and K, for the same reason.

An example is presented here to illustrate the use of this formalism for the choices p=2, J=4, K=2, as in FIG. 1. Assume that the Statistical Profile produces the following "most probable" sub-block pixel patterns, using the format for Contiguous Pixels discussed above. Only four neighborhood values NV=0 (00000000), 1 (00000001), 2 (00000010) and 3 (00000011) are considered for convenience, out of the $2^8=256$ possible neighborhood values NV or Contiguous Pixel configurations that may occur in the Statistical Profile. For the choice p=2, $2^2-1=3$ "most probable" sub-block pixel patterns are chosen for each neighborhood val corresponding to the prediction values PV=0, 1 and 2. The prediction value PV=3 corresponds to the exact pixel pattern.

TABLE 1

| PV = | Neighborhood Values/Predicted Pixel Patterns | | | |
|---|---|---|---|---|
| | 0(00) | 1(01) | 2(10) | 3(11) |
| NV = 0 | 3 | 14 | 6 | correct (unpredicted) pattern |
| 1 | 13 | 7 | 31 | correct (unpredicted) pattern |
| 2 | 15 | 46 | 11 | correct (unpredicted) pattern |
| 3 | 6 | 7 | 14 | correct (unpredicted) pattern |

Assume the following (shortened) sequence of sub-block pixel patterns is encountered: 3(NV=0); 14(NV=3); 12(NV=1); 6(NV=0); 13(NV=1); 17(NV=2), corresponding to sub-blocks numbered s=1, 2, 3, 4, 5 and 6, respectively. The pixel patterns for the sub-blocks numbered s=3 and s=6 must be specified exactly (corresponds to PV=3) rather than by reference to the predicted pixel patterns available from the Statistical Profile. The sub-block numbers plus the associated prediction value PVs can be expressed as an ordered pair of numbers $(s, PV_s)$ that indicates exactly the pixel pattern for each of these sub-blocks s=1, 2, .., 6. The sequence of these ordered pairs then becomes (1,0), (2,2), (3,3), (4,2), (5,0), (6,3). In this example, four of the six sub-block pixel patterns are predictable from the Contiguous Pixel neighborhood values NV associated with the various sub-blocks, using the Statistical Profile information set forth in Table 1 above. The remaining two pixel patterns must be specified exactly by reference to the Contiguous Pixel predictor value PV =3, which flags or points to the location of the exact pixel patterns for these two sub-blocks, maintained in a supplementary list. FIG. 3 illustrates the eight subblock pixel patterns present in the entries in Table 1.

The total number of bits required for the sequence of predictor values PV (expressed in the binarycoded decimal form shown in Table 1) is 6×2+8 (subblock s=3)+8 (sub-block s=6)=28 bits, as compared to a conventional bit map that would require 6×8=48 bits. In practice, the percentage reduction in the total number of bits required for compressed representation of a character set is 30–70 percent, corresponding to a compression ratio of 7:5 up to 10:3.

Decompression, for the purpose of representing a character as an assembly of sub-block pixel patterns, proceeds as follows.

| Sub-block | |
|---|---|
| s = 1 | NV = 0; pixel pattern = 3 |
| s = 2 | NV = 3; pixel pattern = 14 |
| s = 3 | NV = 1; pixel pattern = 12 (in supplementary list) |
| s = 4 | NV = 0; pixel pattern = 6 |
| s = 5 | NV = 1; pixel pattern = 13 |
| s = 6 | NV = 2; pixel pattern = 17 (in supplementary list) |

As each sub-block is added to the array, for a given character, the neighborhood value NV produced by the Contiguous Pixel patterns from preceding sub-blocks is used together with the predictor value PV to determine the pixel pattern of this new sub-block.

Simulation testing of the first embodiment, involving a single level of $2^p-1=1,3$ or 7 "most probable" pixel patterns has been performed on two subsets of 225 characters each from a Kanji character set. The prediction tables were calculated independently for each character subset. For a 24 pixel-by-24 pixel array representing each character in each subset, Table 2 presents the average bit savings or compression percentage (reduction) achieved for these two subsets.

TABLE 2

| Bit Savings Using One-level Neighborhood Prediction | |
|---|---|
| Number of Prediction Bits | Bit Savings |
| p = 1 | 33.65% |
| 2 | 39.86% |
| 3 | 39.70% |

The best choice from these results for one-level prediction appears to be p=2 (three predictions plus exact value, if no prediction is correct). This best choice may vary with the size and nature of the character subset chosen, but it is expected that one of the two choices p=2 or p=3 will generally be the best choice.

FIG. 4 illustrates some of the results of testing and analysis of the character shown in FIG. 2, in which black pixel values could not be correctly predicted as such (exact configuration used) and gray or crosshatched pixels were predicted to be black using the Statistical Profile information. The black pixel values were thus part of sub-blocks whose pixel patterns were prescribed exactly from the supplementary list, using the index r=4 (PV=3) for the two-bit index (p=2). A white pixel is always displayed as such so as not to clutter the figure.

A second implementation of the invention uses a 4×2 (or, more generally, a J×K) rectangular block of pixels as shown in FIG. 1 but includes two levels of prediction of the target sub-block pixel patterns, using the Contiguous Pixels enumerated 1 (or 1'), 2, 3, 5, 6, 7 and 8 as shown in FIG. 1. In a first embodiment of this second implementation, each character corresponds to (1) a table of 1 bit per sub-block for a first level prediction thereof and (2) a list of Q-1 second level predictions (Q≧2) plus the exact configuration of the target sub-block. At the first or lowest level of prediction, the only predicted configuration of the target sub-block is the most probable configuration (PV=0 or r=1) corresponding to the neighborhood value NV of the Contiguous Pixels. This corresponds to bit no. 1 having the value 0. If this prediction is incorrect, the value of bit no. 1 is set equal to 1 and the second level of prediction is used. At this second level of prediction, the rth most probable configurations are presented (r=2, 3, ..., Q) to predict the target sub-block configuration. For convenience and efficiency, one can choose $Q=2^q$, where q is a positive integer, for example, q=4. With $Q=2^q$, bits 2, 3, ..., q+1 represent the Q−1 predictions available at this second level. As an example, let the (q+1)- tuple (a1, a2, ..., $a_{q+1}$) be the bits representing the first and second level predictions and the exact pixel pattern, if needed. The first level prediction corresponds to $a_1=0$, with the bit values for a2, ..., $a_{q+1}$ being unimportant. For the second level predictor, $a_1=1$, and among the remaining q bits a2,..., $a_{q=1}$ at least one of these bits has the value 0. If none of the $Q-1=2^q-1$ predictions at the second level is correct, all the bit values a1, a2, ..., $a_{q=1}$ are set equal to 1 and the exact sub-block configuration is used here. For example, if q=4 is chosen here, the first level prediction has a single predicted configuration; and the second level of prediction has 15 predicted values plus the exact pixel pattern for the target sub-block, if needed. The number of bits required for q =4 in this embodiment of the second implementation is 1(first level) prediction +4 (second level prediction) =5 bits or 5+8 (exact pixel configuration, as a default) =13 bits.

This second implementation may be generalized by providing t bits at the first level, corresponding to $2^t-1$ predictions at the first level, plus q bits at the second level of prediction as discussed above, where t is a positive integer that may be chosen independently of the integer q. In practice, the choice t=1 or t=2 and q=4 is satisfactory here. Tables 3 and 4 present the bit savings or percentage compression using a two-level neighborhood prediction code for the choices q=4 and t=1, 2 or 3, for a 24×24 font fragment and a 40×40 font fragment, respectively. The choice T=1 appears to be the best choice here for the 6802-character set discussed above. Note that, for the larger font size, the average bit savings can exceed 68 percent.

TABLE 3

| Bit-Savings Using Two-Level Neighborhood Prediction (24 × 24 pixels) | |
|---|---|
| Number of Prediction Bits | Bit Savings |
| t = 1 | 52.73% |
| 2 | 50.74% |
| 3 | 47.13% |

TABLE 4

Bit-Savings Using Two-Level Neighborhood Prediction (40 × 40 pixels)

| Number of Prediction Bits | Bit Savings |
|---|---|
| t = 1 | 68.79% |
| 2 | 63.75% |
| 3 | 57.07% |

This second implementation can be further generalized by use of H prediction levels, with prediction level number h (=1, 2, 3,..., H) having $t_h$ different predictions, which may depend on the level number h, of pixel patterns for each of the different Contiguous Pixel patterns for a sub-block of pixels. The prediction process would proceed from prediction level h to prediction level h+1 (h=1, 2,..., H−1), until the correct pixel pattern is determined by prediction or the exact pixel pattern is flagged by default.

FIG. 5 illustrates the result of the two-level prediction, applied to the Kanji characters shown in FIG. 2 for a 24×24 character representation with two levels of prediction. In FIG. 5, the block positions that are shaded black represent pixels that could not be predicted at either level of prediction so that the exact values had to be used for that sub-block. The dark gray pixels could be predicted at the second level of prediction, but not at the first level, and the light gray pixels could be predicted at the first level of prediction. The white pixels are always displayed as such, as discussed above in connection with FIG. 4.

FIGS. 6, 7 and 8 illustrate three other neighborhood predictor configurations (Contiguous Pixels, enumerated 1 or 1', 2, 3, 4, 5, 6, 7 and 8) with a 4 bit ×2 bit sub-block, using the neighborhood predictor code according to the invention. Each of the neighborhood predictor configurations shown in FIGS. 6, 7 and 8 may be used in a one-level prediction scheme or in a two-level prediction scheme, as discussed above. As discussed earlier, the 4 bit ×2 bit sub-block shown in any of FIGS. 1, 6, 7 and 8 may be replaced by a more general J bit ×K bit rectangular sub-block for purposes of application of the invention.

Another neighborhood predictor configuration is illustrated in FIG. 9, where a sub-block 21 that is J pixels wide by K pixels high is surrounded by a set B 2J+2K+4 contiguous pixels, numbered c1, c2, c3,..., c(2J+2K+3), c(2J+2K+4). A subset B1 of L pixels ("Contiguous Pixels") from the set B of 2J+2K+4 boundary pixels is chosen, and a Statistical Profile of the sub-block 11 is developed using the L pixels of the set B of boundary pixels. For each sub-block 11, the Statistical Profile of the set B1 of L Contiguous Pixels is used to construct the rth most probable pixel pattern for the sub-block 11 ($r=1,2,...,2^P-1$), as described above. If one of these $2^P-1$ pixel patterns achieves an exact match, a flag or other indicia is used to indicate or point to the exact pixel pattern, and this exact pixel pattern is used as described above.

For example, with the choice J=4 and K=2 the maximum number of boundary pixels is 2J+2K+4=16 for the 8-pixel sub-block. The set B1 of Boundary Pixels could consist of all 16 contiguous or of a proper subset of L of these, where L may be any smaller positive integer such as L=3 or L=8. The choice L=2, 4 or 8 is attractive here.

In another embodiment of this invention, the requirement that the pixel pattern of the sub-block 11 (FIGS. 1, 1A, 6, 7, 8) or 21 (FIG. 9) be predicted exactly by the neighborhood predictor is relaxed so that, of the J·K pixels in the sub-block, it is sufficient if some smaller number V be predicted correctly, where V<J·K. Two attractive choices are V=J·K−1 and V=J·K−2. As before, the Statistical Profile of sub-block pixel patterns corresponding to each set of Contiguous Pixels/or Boundary Pixels) is constructed; the particular set of Contiguous Pixels (or Boundary Pixels) for each sub-block is analyzed; and the rth most probable sub-block pixel patterns ($r=1,2,...,2^P-1$) are compared with the actual or exact pixel pattern. If V=J·K−w (w=1 or 2 or ...), a predicted pixel pattern that differs from the exact pixel pattern of the sub-block 11 or 21 by as many as w pixels is accepted as a (sufficiently close) match. This embodiment, in which the predicted pixel pattern of the sub-block 11 or 21 may have 0,1,2,..., or up to w pixel mismatches, will be referred to as an Augmented Pixel Match of Level w (w≧1).

The methods disclosed here may also be applied to prediction and encoding of any image representable as an array of pixels of two levels (e.g., dark and light). Thus, the method is not restricted to use on collections of ideographic symbols.

Given an embodiment which utilizes the Augmented Pixel Match scheme, it may be desirable to calculate the Statistical Profile by a slightly different method. In this method, the probability of a particular sub-block is calculated from the frequency of occurrence of an exact sub-block pattern given the NPC and from frequency of close matches to that sub-block pattern. The frequency of exact matches can be combined with those of Augmented Pixel Matches through the use of a weighted sum. This allows the effect of Augmented Pixel Matches to be controlled when choosing the most probable sub-block values.

The construction of the pixel pattern, one sub-block at a time, is not limited to proceeding from a selected corner such as illustrated in FIGS. 1, 1A, 6, 7 and 8. As illustrated in FIG. 10, an arbitrary column n=n1 and an arbitrary row m=m1 can be chosen and fixed within the block of M×N sub-blocks, and the exact pixel patterns for each of the sub-blocks with coordinates (m,n) with m=m1 or n=n1 or both can be determined. As indicated in FIG. 10, the choice of m=m1 and n=n1 (for 1<m1<M and 1<n1<N) will divide the original block of pixels into four groups of sub-blocks with the following coordinates (m,n):

Group I : 1≦m≦m1−1; 1≦n≦n1−1;
Group II : m+1≦m≦M; 1≦n≦n1−1;
Group III: 1≦m≦m1−1; n1+1≦n≦N;
Group IV : m1+1≦m≦M; n1+1≦n≦N.

The pixel patterns of each sub-block in each of the Groups I, II, III and IV is unknown and is to be constructed from knowledge of the exact pixel pattern of each sub-block in a fifth group, namely Group V : m=m1; 1≦n≦N; and 1≦m≦M; n=n1.

A Statistical Profile of all sub-blocks in Group IV is provided, using the Contiguous Pixel pattern (assumed known) located to the left and above each such sub-block as illustrated in FIG. 1. A Statistical Profile of all sub-blocks in Group III is provided, using the Contiguous Pixel pattern (assumed known) located to the right and above each such sub-block as illustrated in FIG. 6. A Statistical Profile of all sub-blocks in Group I is provided, using the Contiguous Pixel pattern (assumed known) located to the right and below each such sub-block as illustrated in FIG. 7. Finally, a Statistical Profile of all sub-blocks in Group II is provided, using the Contiguous Pixel pattern (assumed known) located to the left and below each such sub-block as illustrated in FIG. 8.

Note that the Statistical Profile for each of the 5 Groups I, II, III and IV is determined using a different location for the Contiguous Pixels used to predict the pixel pattern of each sub-block within that Group. For each of the Groups I-IV of sub-blocks, prediction begins with the known pixel patterns in each of the sub-blocks in Group V and proceeds outward toward the boundaries of the block of pixels.

If the choice m1=1 is made, Groups I and III disappear and only Groups II and IV remain so that only two Statistical Profiles are required, for Contiguous Pixel patterns illustrated in FIGS. 8 and 1, respectively. Similarly, if the choice m1=M is made, Groups II and IV disappear and only Groups I and III remain. Similarly, if the choice n1=1 is made, Groups I and II disappear and only Groups III and IV remain. Similarly, if the choice n1=N is made, Groups III and IV disappear and only Groups I and II remain. If m1 is chosen to be 1 or M and n1 is chosen to be 1 or N, three of the four Groups disappear and only one Group remains, corresponding to proceeding from one of the four selected corners as illustrated in FIGS. 1, 1A, 6, 7 and 8, as discussed above.

The invention has been illustrated with reference to a set of 6802 Kanji characters. The invention is equally applicable to a different set of Kanji characters of any size, a set of Chinese, Hebrew, Arabic, Tamil or Farsi language characters. The invention may be applied to any set of reasonable size of ideograph symbols used to represent sounds, words or phrases, or to represent any image that is representable by two levels or shades of pixels.

I claim:

1. A method of compression of data used to describe a collection of ideographic symbols, each represented as a pixel pattern on a block of pixels, the method comprising the steps of:

decomposing the block of pixels for each ideographic symbol into $M \times N$ mutually exclusive, rectangular sub-blocks of pixels, each of size J pixels $\times$ K pixels, where M, N, J and K are positive integers, the sub-blocks being numbered consecutively $s=1, 2, \ldots, S$ beginning at a selected corner of the block and proceeding consecutively row-by-row or column-by-column from the selected corner, where each sub-block is also represented by a unique two-dimensional coordinate (m,n) ($m=1, 2, \ldots, M$; $n=1, 2, \ldots, N$);

for a predetermined integer m1 in the range $1 \leq m1 \leq M$ and a predetermined integer n1 in the range $1 \leq n1 \leq N$, determining the exact pixel patterns of each of the sub-blocks numbered (m,n) for which $m=m1$ or $n=n1$ or both $m=m1$ and $n=n1$;

for each pixel sub-block with coordinates (m,n) with $1 \leq m \leq m1-1$ and $1 \leq n \leq n1-1$, determining the pixel values of the Contiguous Pixels in the sub-blocks with coordinates (m+1,n), (m+1,n+1) and (m,n+1) and determining the Statistical Profile of the collection of ideographic symbols and associated Contiguous Pixels for each of these sub-blocks;

for each pixel sub-block with coordinates (m,n) with $1 \leq m \leq m1-1$ and $n1+1 \leq n \leq N$, determining the pixel values of the Contiguous Pixels in the sub-blocks with coordinates (m+1,n), (m+1,n−1) and (m,n−1) and determining the Statistical Profile of the collection of ideographic symbols and associated Contiguous Pixels for each of these sub-blocks;

for each pixel sub-block with coordinates (m,n) with $m1+1 \leq m \leq M$ and $1 \leq n \leq n1-1$, determining the pixel values of the Contiguous Pixels in the sub-blocks with coordinates (m−1,n), (m−1,n+1) and (m,n+1) and determining the Statistical Profile of the collection of ideographic symbols and associated Contiguous Pixels for each of these sub-blocks;

for each pixel sub-block with coordinates (m,n) with $m1+1 \leq m \leq M$ and $n1+1 \leq n \leq N$, determining the pixel values of the Contiguous Pixels in the sub-blocks with coordinates (m−1,n), (m−1,n−1) and (m,n−1) and determining the Statistical Profile of the collection of ideographic symbols and associated Contiguous Pixels for each of these sub-blocks;

for each sub-block numbered $s=1, 2, \ldots, S$ for which a Statistical Profile exists, determining, from the Statistical Profile of Contiguous Pixels, the rth most probable pattern of pixels in that sub-block for each of $r=1, 2, \ldots, R-1$, where R is a selected integer $\leq 2$, and assigning an index $a_{rs}$ corresponding to the choice of the $r^{th}$ most probable pixel pattern for the sub-block numbered s;

for each sub-block numbered $s=1, 2, \ldots, S$, assigning the index $a_{rs}^-$ if the predicted pixel pattern corresponding to the index $a_{rs}^-$ is the correct pattern, and assigning an index $a_{Rs}$ that requires use of the exact pixel pattern for sub-block s, if none of the $R-1$ predicted pixel patterns corresponding to the indices $a_{rs}$ ($r=1, 2, \ldots, R-1$) is the correct pattern, or if the coordinates (m,n) of the sub-block satisfy $m=m1$ or $n=n1$ or both $m=m1$ and $n=n1$; and associating with each sub-block numbered $s=1, 2, \ldots, S$ the assigned index $a_{rs}^-$ or $a_{Rs}$, as the case may be, as an ordered pair of numbers $(s, a_{rs}^-)$ or $(s, a_{Rs})$.

2. The method of claim 1, further comprising the steps of choosing said integer $J=4$ and choosing said integer $K=2$.

3. The method of claim 1, further comprising the steps of choosing said integer $M=24$ and choosing said integer $N=24$.

4. The method of claim 1, further comprising the step of choosing said integer $M=40$ and said integer $N=40$.

5. The method of claim 1, further comprising the step of choosing said integer $R=2^t$, where t is a positive integer.

6. The method of claim 5, further comprising the step of choosing said integer t from the class of positive integers consisting of 1, 2 and 3.

7. The method of claim 1, further comprising the step of:

for each of said sub-blocks numbered $s=1, 2, \ldots, S$, and said corresponding index $a_{rs}^-$ or $a_{Rs}$ in said ordered pair of numbers $(s, a_{rs}^-)$ or $(s, a_{Rs})$, constructing said sub-block pixel pattern corresponding to said index $a_{rs}^-$ or $a_{Rs}$, as the case may be; and positioning each of said sub-block pixel patterns at its position in said block of pixels, whereby the pixel pattern manifested by the collection of said sub-block pixel patterns represents an ideographic symbol.

8. A method of compression of data used to describe a collection of ideographic symbols, each represented as a pixel pattern on a block of pixels, the method comprising the steps of:

decomposing the block of pixels for each ideographic symbol into $M \times N$ mutually exclusive, rectangular sub-blocks of pixels, each of size J pixels $\times$ K pixels, where M, N, J and K are positive integers, the sub-blocks being numbered consecutively $s = 1, 2, \ldots, S$ beginning at a selected corner of the block and proceeding consecutively row-by-row or column-by-column from the selected corner, where each sub-block is also represented by a unique two-dimensional coordinate (m,n) ($m = 1, 2, \ldots, M$; $n = 1, 2, \ldots, N$) where the row containing the selected corner has sub-blocks with coordinates (1,1), (2,1), ..., (M,1) and the column containing the selected corner has sub-blocks with coordinates (1,1), (1,2), ..., (1,N);

for a predetermined integer m1 in the range $1 \leq m1 \leq M$ and a predetermined integer n1 in the range $1 \leq n1 \leq N$, determining the exact pixel patterns of each of the sub-blocks numbered (m,n) for which $m = m1$ or $n = n1$ or both $m = m1$ and $n = n1$;

for each pixel sub-block with coordinates (m,n) with $1 \leq m \leq m1 - 1$ and $1 \leq n \leq n1 - 1$, determining the pixel values of the Contiguous Pixels in the sub-blocks with coordinates (m+1,n), (m+1,n+1) and (m,n+1) and determining the Statistical Profile of the collection of ideographic symbols and associated Contiguous Pixels for each of these sub-blocks;

for each pixel sub-block with coordinates (m,n) with $1 \leq m \leq m1 - 1$ and $n1 + 1 \leq n \leq N$, determining the pixel values of the Contiguous Pixels in the sub-blocks with coordinates (m+1,n), (m+1,n-1) and (m,n-1) and determining the Statistical Profile of the collection of ideographic symbols and associated Contiguous Pixels for each of these sub-blocks;

for each pixel sub-block with coordinates (m,n) with $m1 + 1 \leq m \leq M$ and $1 \leq n \leq n1 - 1$, determining the pixel values of the Contiguous Pixels in the sub-blocks with coordinates (m-1,n), (m-1,n+1) and (m,n+1) and determining the Statistical Profile of the collection of ideographic symbols and associated Contiguous Pixels for each of these sub-blocks;

for each pixel sub-block with coordinates (m,n) with $m1 + 1 \leq m \leq M$ and $n1 + 1 \leq n \leq N$, determining the pixel values of the Contiguous Pixels in the sub-blocks with coordinates (m-1,n), (m-1,n-1) and (m,n-1) and determining the Statistical Profile of the collection of ideographic symbols and associated Contiguous Pixels for each of these sub-blocks;

for each sub-block numbered $s = 1, 2, \ldots, S$, determining, from the Statistical Profile of Contiguous Pixels, the rth most probable pattern of pixels in that sub-block for each of $r = 1, 2, \ldots, T + Q - 2$, where T and Q are each selected integer $\leq 2$, and assigning an index $a_{rs}$ corresponding to the choice of the $r^{th}$ most probable pixel pattern for the sub-block numbered s;

for each sub-block numbered $s = 1, 2, \ldots, S$, assigning the index $a_{\bar{r}_s}$ ($r = 1, 2, \ldots,$ or $T - 1$) if the predicted pixel pattern corresponding to the index $a_{\bar{r}_s}$ is the correct pattern, assigning the index $a_{r's}$ ($r' = T$, $T+1, \ldots,$ or $T+Q-2$) if the predicted pixel pattern corresponding to the index $a_{r's}$ is the correct pattern, and assigning an index $a_{R_s}$ with $R = T + Q - 1$ that indicates the exact pixel pattern for sub-block s, if none of the $R - 1$ predicted pixel patterns corresponding to the indices ars ($r = 1, 2, \ldots, R - 1$) is the correct pattern, or if the corrdinates (m,n) of the sub-block satisfy $m = m1$ or $n = n1$ or both $m = m1$ and $n = n1$; and associating with each sub-block numbered $s = 1, 2, \ldots, S$ the assigned index $a_{\bar{r}_s}$ ($r = 1, 2, \ldots,$ or $T - 1$) or the assigned index $a_{r's}$ ($r' = T, T+1, \ldots,$ or $T + Q - 2$) or the assigned index $a_{R_s}$, as the case may be, as an ordered pair of numbers $(s, a_{\bar{r}_s})$ or $(s, a_{R_s})$.

9. The method of claim 8, further comprising the steps of choosing siad integer $J = 4$ and choosing siad integer $K = 2$.

10. The method of claim 8, further comprising the steps of choosing said integer $M = 24$ and choosing said integer $N = 24$.

11. The method of claim 8, further comprising the steps of choosing said integer $M = 40$ and choosing said integer $N = 40$.

12. The method of claim 8, further comprising the steps of choosing said integer $T = 2^t$, where t is a positive integer, and choosing said integer $Q = 2^q$, where q is a positive integer.

13. The method of claim 12, further comprising the steps of choosing each of said integers t and q from the class of positive integers consisting of 1, 2 and 3.

14. The method of claim 15, further comprising the step of:

for each of said sub-blocks numbered $s = 1, 2, \ldots, S$, and said corresponding index $a_{\bar{r}_s}$ or $a_{R_s}$ in said ordered pair of numbers $(s, a_{\bar{r}_s})$ or $(s, a_{R_s})$, constructing said sub-block pixel pattern corresponding to said index $a_{\bar{r}_s}$ or $a_{R_s}$, as the case may be; and positioning each of said sub-block pixel patterns at its position in said block of pixels, whereby the pixel pattern manifested by the collection of said sub-block pixel patterns represents an ideographic symbol.

15. A method of compression of data used to describe a collection of ideographic symbols, each represented as a pixel pattern on a block of pixels, the method comprising the steps of:

decomposing the block of pixels for each ideographic symbol into $M \times N$ mutually exclusive, rectangular sub-blocks of pixels, each of size J pixels $\times$ K pixels, where M, N, J and K are positive integers, the sub-blocks being numbered consecutively $s = 1, 2, \ldots, S$ beginning at a selected corner of the block and proceeding consecutively row-by-row or column-by-column from the selected corner, where each sub-block is also represented by a unique two-dimensional coordinate (m,n) ($m = 1, 2, \ldots, M$; $n = 1, 2, \ldots, N$);

for a predetermined integer m1 in the range $1 \leq m1 \leq M$ and a predetermined integer n1 in the range $1 \leq n1 \leq N$, determining the exact pixel patterns of each of the sub-blocks numbered (m,n) for which $m = m1$ or $n = n1$ or both $m = m1$ and $n = n1$;

for each pixel sub-block with coordinates (m,n) with $1 \leq m \leq m1 - 1$ and $1 \leq n \leq n1 - 1$, determining the pixel values of the Contiguous Pixels in the sub-blocks with coordinates (m+1,n), (m+1,n+1) and (m,n+1) and determining the Statistical Profile of the collection of ideographic symbols and associated Contiguous Pixels for each of these sub-blocks;

for each pixel sub-block with coorindates (m,n) wtih $1 \leq m \leq m1-1$ and $n1+1 \leq n \leq N$, determining the pixel values of the Contiguous Pixels in the sub-blocks with coordinates $(m+1,n)$, $(m+1,n-1)$ and $(m,n-1)$ and determining the Statistical Profile of the collection of ideographic symbols and associated Contiguous Pixels for each of these sub-blocks;

for each pixel sub-block with coordinates (m,n) with $m1+1 \leq m \leq M$ and $1 \leq n \leq n1-1$, determining the pixel values of the Contiguous Pixels in the sub-blocks with coordinates $(m-1,n)$, $(m-1,N+1)$ and $(m,n+1)$ and determining the Statistical Profile of the collection of ideographic symbols and associated Contiguous Pixels for each of these sub-blocks;

for each pixel sub-block with coordinates (m,n) with $m1+1 \leq m \leq M$ and $n1+1 \leq n \leq N$, determining the pixel values of the Contiguous Pixels in the sub-blocks with coordinates $(m-1,n)$, $(m-1,N-1)$ and $(m,n-1)$ and determining the Statistical Profile of the collection of ideographic symbols and associated Contiguous Pixels for each of these sub-blocks;

for each sub-block numbered $s=1, 2, \ldots, S$ for which a Statistical Profile exists, determining, from the Statistical Profile of Contiguous Pixels, the rth most probable pattern of pixels in that sub-block for $r=1, 2, \ldots, R-1$, where R is a selected integer $\leq 2$, and assigning an index ars corresponding to the choice of the $r^{th}$ most probable pixel pattern for the sub-block numbered s;

for each sub-block numbered $s=1, 2, \ldots, S$, assigning the index $a_{r_s}$, if the predicted pixel pattern corresponding to the index $a_{r_s}$ is an Augmented Pixel Match of Level w, for a selected value of a positive in1 teger w with $w<J \cdot K$, and assigning an index $a_{Rs}$ that requires use of the exact pixel pattern for sub-block s, if none of the $R-1$ predicted pixel patterns corresponding to the indices $a_{rs}$ ($r=1, 2, \ldots, R-1$) is an Augmented Pixel Match of Level w, or if the coordinates (m,n) of the sub-block satisfy $m=m1$ or $n=n1$ or both $m=m1$ and $n=n1$; and associating with each sub-block numbered $s=1, 2, \ldots, S$ the assigned index $a_{r_s}$ or $a_{Rs}$, as the case may be, as an ordered pair of numbers $(s, a_{r_s})$ or $(s, a_{Rs})$.

16. The method of claim 15, further comprising the steps of choosing said integer $J=4$ and choosing said integer $K=2$.

17. The method of claim 15, further comprising the steps of choosing said integer $M=24$ and choosing said integer $N=24$.

18. The method of claim 15, further comprising the step of choosing said integer $M=40$ and said integer $N=40$.

19. The method of claim 15, further comprising the step of choosing said integer $R=2^t$, where t is a positive integer.

20. The method of claim 19, further comprising the step of choosing said integer t from the class of positive integers consisting of 1, 2 and 3.

21. The method of claim 15, further comprising the step of choosing said integer $w=1$.

22. The method of claim 15, further comprising the step of:

for each of said sub-blocks numbered $s=1, 2, \ldots, S$, and said corresponding index $a_{r_s}$ or $a_{Rs}$ in said ordered pair of numbers $(s, a_{r_s})$ or $(s, a_{Rs})$, constructing said sub-block pixel pattern corresponding to said index $a_{r_s}$ or $a_{Rs}$, as the case may be; and positioning each of said sub-block pixel patterns at its position in said block of pixels, whereby the pixel pattern manifested by the collection of said sub-block pixel patterns represents an ideographic symbol.

* * * * *